United States Patent
Balusu et al.

(10) Patent No.: US 12,450,883 B2
(45) Date of Patent: Oct. 21, 2025

(54) SYSTEMS AND METHODS FOR PROCESSING IMAGES CAPTURED AT A PRODUCT STORAGE FACILITY

(71) Applicant: WALMART APOLLO, LLC, Bentonville, AR (US)

(72) Inventors: Raghava Balusu, Achanta (IN); Avinash M. Jade, Bangalore (IN); Lingfeng Zhang, Dallas, TX (US); William C. Robinson, Jr., Centerton, AR (US); Benjamin R. Ellison, San Francisco, CA (US); Srinivas Muktevi, Bengaluru (IN); Amit Jhunjhunwala, Bangalore (IN); Zhaoliang Duan, Frisco, TX (US); Siddhartha Chakraborty, Kolkata (IN); Ashlin Ghosh, Ernakulam (IN); Mingquan Yuan, Flower Mound, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 241 days.

(21) Appl. No.: 18/158,925

(22) Filed: Jan. 24, 2023

(65) Prior Publication Data
US 2024/0249505 A1 Jul. 25, 2024

(51) Int. Cl.
*G06V 10/774* (2022.01)
*G06V 10/74* (2022.01)
(Continued)

(52) U.S. Cl.
CPC .......... *G06V 10/774* (2022.01); *G06V 10/761* (2022.01); *G06V 10/945* (2022.01); *G06V 20/50* (2022.01); *G06V 10/82* (2022.01)

(58) Field of Classification Search
CPC .... G06Q 10/087; G06V 10/762; G06V 20/52; G06V 2201/07; G06V 10/761;
(Continued)

(56) References Cited

U.S. PATENT DOCUMENTS

| 5,074,594 A | 12/1991 | Laganowski |
| 6,570,492 B1 | 5/2003 | Peratoner |

(Continued)

FOREIGN PATENT DOCUMENTS

| CN | 106347550 B | 8/2019 |
| CN | 110348439 B | 10/2019 |

(Continued)

OTHER PUBLICATIONS

U.S. Appl. No. 17/963,751, filed Oct. 11, 2022, Yilun Chen.
(Continued)

*Primary Examiner* — Michael J Vanchy, Jr.

(57) ABSTRACT

In some embodiments, apparatuses and methods are provided herein useful to processing captured images of objects at a product storage facility. In some embodiments, there is provided a system for processing captured images of objects including a trained machine learning model and a control circuit. In some embodiments, the trained machine learning model is configured to process unprocessed captured images. In some embodiments, the control circuit is configured to associate each of the processed images into one of a first group, a second group, or a third group; remove at least one processed image associated with the first group from the processed images in accordance with a first processing rule; and output remaining processed images associated with the first group and processed images associated with the second group to be used to retrain the trained machine learning model.

18 Claims, 13 Drawing Sheets

(51) Int. Cl.
  *G06V 10/94* (2022.01)
  *G06V 20/50* (2022.01)
  *G06V 10/82* (2022.01)

(58) Field of Classification Search
  CPC .. G06V 10/25; G06V 10/7715; G06V 10/774; G06V 10/82; G06V 10/945; G06V 20/50; G06V 30/1444; G06T 7/50; G06T 7/70
  See application file for complete search history.

(56) References Cited

U.S. PATENT DOCUMENTS

| | | |
|---|---|---|
| 8,923,650 B2 | 12/2014 | Wexler |
| 8,965,104 B1 | 2/2015 | Hickman |
| 9,275,308 B2 | 3/2016 | Szegedy |
| 9,477,955 B2 | 10/2016 | Goncalves |
| 9,526,127 B1 | 12/2016 | Taubman |
| 9,576,310 B2 | 2/2017 | Cancro |
| 9,659,204 B2 | 5/2017 | Wu |
| 9,811,754 B2 | 11/2017 | Schwartz |
| 10,002,344 B2 | 6/2018 | Wu |
| 10,019,803 B2 | 7/2018 | Venable |
| 10,032,072 B1 | 7/2018 | Tran |
| 10,129,524 B2 | 11/2018 | Ng |
| 10,210,432 B2 * | 2/2019 | Pisoni ............... G06F 18/217 |
| 10,373,116 B2 | 8/2019 | Medina |
| 10,572,757 B2 | 2/2020 | Graham |
| 10,592,854 B2 | 3/2020 | Schwartz |
| 10,839,452 B1 | 11/2020 | Guo |
| 10,922,574 B1 | 2/2021 | Tariq |
| 10,943,278 B2 | 3/2021 | Benkreira |
| 10,956,711 B2 | 3/2021 | Adato |
| 10,990,950 B2 | 4/2021 | Garner |
| 10,991,036 B1 | 4/2021 | Bergstrom |
| 11,036,949 B2 | 6/2021 | Powell |
| 11,055,905 B2 | 7/2021 | Tagra |
| 11,087,272 B2 | 8/2021 | Skaff |
| 11,151,426 B2 | 10/2021 | Dutta |
| 11,163,805 B2 | 11/2021 | Arocho |
| 11,276,034 B2 | 3/2022 | Shah |
| 11,282,287 B2 | 3/2022 | Gausebeck |
| 11,295,163 B1 | 4/2022 | Schoner |
| 11,308,775 B1 | 4/2022 | Sinha |
| 11,409,977 B1 | 8/2022 | Glaser |
| 2005/0238465 A1 | 10/2005 | Razumov |
| 2011/0040427 A1 | 2/2011 | Ben-Tzvi |
| 2014/0002239 A1 | 1/2014 | Rayner |
| 2014/0247116 A1 | 9/2014 | Davidson |
| 2014/0307938 A1 | 10/2014 | Doi |
| 2015/0363660 A1 | 12/2015 | Vidal |
| 2016/0203525 A1 | 7/2016 | Hara |
| 2016/0260051 A1 | 9/2016 | Wu et al. |
| 2017/0106738 A1 | 4/2017 | Gillett |
| 2017/0286773 A1 | 10/2017 | Skaff |
| 2017/0286901 A1 | 10/2017 | Skaff et al. |
| 2018/0005176 A1 | 1/2018 | Williams |
| 2018/0018788 A1 | 1/2018 | Olmstead |
| 2018/0108134 A1 | 4/2018 | Venable |
| 2018/0197223 A1 | 7/2018 | Grossman |
| 2018/0260772 A1 | 9/2018 | Chaubard |
| 2019/0025849 A1 | 1/2019 | Dean |
| 2019/0043003 A1 | 2/2019 | Fisher |
| 2019/0050932 A1 | 2/2019 | Dey |
| 2019/0087772 A1 * | 3/2019 | Medina ............... G05D 1/106 |
| 2019/0149725 A1 * | 5/2019 | Adato ............... H04N 1/00 348/158 |
| 2019/0163698 A1 | 5/2019 | Kwon |
| 2019/0197561 A1 | 6/2019 | Adato |
| 2019/0220482 A1 | 7/2019 | Crosby |
| 2019/0236531 A1 | 8/2019 | Adato |
| 2020/0118063 A1 | 4/2020 | Fu |
| 2020/0246977 A1 | 8/2020 | Swietojanski |
| 2020/0265494 A1 | 8/2020 | Glaser |
| 2020/0324976 A1 | 10/2020 | Diehr |
| 2020/0356813 A1 * | 11/2020 | Sharma ............... G06V 10/17 |
| 2020/0380226 A1 | 12/2020 | Rodriguez |
| 2020/0387858 A1 | 12/2020 | Hasan |
| 2021/0049541 A1 | 2/2021 | Gong |
| 2021/0049542 A1 | 2/2021 | Dalal |
| 2021/0142105 A1 | 5/2021 | Siskind |
| 2021/0150231 A1 | 5/2021 | Kehl |
| 2021/0192780 A1 | 6/2021 | Kulkarni |
| 2021/0216954 A1 | 7/2021 | Chaubard |
| 2021/0272269 A1 | 9/2021 | Suzuki |
| 2021/0319420 A1 | 10/2021 | Yu et al. |
| 2021/0319684 A1 | 10/2021 | Ma |
| 2021/0342914 A1 | 11/2021 | Dalal |
| 2021/0397800 A1 | 12/2021 | Kim |
| 2021/0400195 A1 | 12/2021 | Adato |
| 2022/0043547 A1 | 2/2022 | Jahjah |
| 2022/0051179 A1 | 2/2022 | Savvides |
| 2022/0058425 A1 | 2/2022 | Savvides |
| 2022/0067085 A1 | 3/2022 | Nihas |
| 2022/0114403 A1 | 4/2022 | Shaw |
| 2022/0114821 A1 | 4/2022 | Arroyo |
| 2022/0138914 A1 | 5/2022 | Wang |
| 2022/0165074 A1 | 5/2022 | Srivastava |
| 2022/0222924 A1 | 7/2022 | Pan |
| 2022/0262008 A1 | 8/2022 | Kidd |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 17/983,773, filed Nov. 9, 2022, Lingfeng Zhang.
U.S. Appl. No. 18/102,999, filed Jan. 30, 2023, Han Zhang.
U.S. Appl. No. 18/103,338, filed Jan. 30, 2023, Wei Wang.
U.S. Appl. No. 18/106,269, filed Feb. 6, 2023, Zhaoliang Duan.
U.S. Appl. No. 18/158,950, filed Jan. 24, 2023, Ishan Arora.
U.S. Appl. No. 18/158,969, filed Jan. 24, 2023, Zhaoliang Duan.
U.S. Appl. No. 18/158,983, filed Jan. 24, 2023, Ashlin Ghosh.
U.S. Appl. No. 18/161,788, filed Jan. 30, 2023, Raghava Balusu.
U.S. Appl. No. 18/165,152, filed Feb. 6, 2023, Han Zhang.
U.S. Appl. No. 18/168,174, filed Feb. 13, 2023, Abhinav Pachauri.
U.S. Appl. No. 18/168,198, filed Feb. 13, 2023, Ashlin Ghosh.
Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; 6 pages.
Kaur, Ramanpreet et al.; "A Brief Review on Image Stitching and Panorama Creation Methods"; International Journal of Control Theory and Applications; 2017; vol. 10, No. 28; International Science Press; Gurgaon, India; < https://www.researchgate.net/publication/348232877 >; 11 pages.
Naver Engineering Team; "Auto-classification of Naver Shopping Product Categories using TensorFlow"; <https://blog.tensorflow.org/2019/05/auto-classification-of-naver-shopping.html>; May 20, 2019; pp. 1-15.

(56) References Cited

OTHER PUBLICATIONS

Paolanti, Marine et al.; "Mobile robot for retail surveying and inventory using visual and textual analysis of monocular pictures based on deep learning"; European Conference on Mobile Robots; Sep. 2017, 6 pages.

Refills; "Final 3D object perception and localization"; European Commision, Dec. 31, 2016, 16 pages.

Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.

Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; 6 pages.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; <https://medium.com/image-processing-in-robotics/colour-detection-e15bc03b3f61>; Jul. 2, 2019; pp. 1-6.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

Verma, Nishchal, et al.; "Object identification for inventory management using convolutional neural network"; IEEE Applied Imagery Pattern Recognition Workshop (AIPR); Oct. 2016, 6 pages.

Zhang, Jicun, et al.; "An Improved Louvain Algorithm for Community Detection"; Advanced Pattern and Structure Discovery from Complex Multimedia Data Environments 2021; Nov. 23, 2021; Mathematical Problems in Engineering; Hindawi; <https://www.hindawi.com/journals/mpe/2021/1485592/>; pp. 1-27.

Kari Rodriquez, PCT International Search Report, mailed Apr. 30, 2024, in connection with International Application No. PCT/US2024/12092, all pages.

Kari Rodriquez, PCT Written Opinion, mailed Apr. 30, 2024, in connection with International Application No. PCT/US2024/12092, all pages.

\* cited by examiner

FALSE NEGATIVE

NEW UPC

POTENTIAL FALSE POSITIVES

POTENTIAL NOISE

SYSTEMS AND METHODS FOR PROCESSING IMAGES CAPTURED AT A PRODUCT STORAGE FACILITY

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751; entitled SYSTEMS AND METHODS OF MAPPING AN INTERIOR SPACE OF A PRODUCT STORAGE FACILITY filed on Oct. 14, 2022, application Ser. No. 17/966,580; entitled SYSTEMS AND METHODS OF DETECTING PRICE TAGS AND ASSOCIATING THE PRICE TAGS WITH PRODUCTS filed on Oct. 21, 2022, application Ser. No. 17/971,350; entitled SYSTEMS AND METHODS OF VERIFYING PRICE TAG LABEL-PRODUCT PAIRINGS filed on Nov. 9, 2022, application Ser. No. 17/983,773; entitled SYSTEMS AND METHODS OF USING CACHED IMAGES TO DETERMINE PRODUCT COUNTS ON PRODUCT STORAGE STRUCTURES OF A PRODUCT STORAGE FACILITY filed Jan. 24, 2023, application Ser. No. 18/158,969; entitled METHODS AND SYSTEMS FOR CREATING REFERENCE IMAGE TEMPLATES FOR IDENTIFICATION OF PRODUCTS ON PRODUCT STORAGE STRUCTURES OF A FACILITY filed Jan. 24, 2023, application Ser. No. 18/158,983; and entitled SYSTEMS AND METHODS FOR PROCESSING IMAGES CAPTURED AT A PRODUCT STORAGE FACILTY filed Jan. 24, 2023, application Ser. No. 18/158,950.

TECHNICAL FIELD

This invention relates generally to recognition of objects in images, and more specifically to training machine learning models to recognize objects in images.

BACKGROUND

A typical product storage facility (e.g., a retail store, a product distribution center, a warehouse, etc.) may have hundreds of shelves and thousands of products stored on the shelves or on pallets. It is common for workers of such product storage facilities to manually (e.g., visually) inspect or inventory product display shelves and/or pallet storage areas to determine which of the products are adequately stocked and which products are or will soon be out of stock and need to be replenished.

Given the very large number of product storage areas such as shelves, pallets, and other product displays at product storage facilities of large retailers, and the even larger number of products stored in the product storage areas, manual inspection of the products on the shelves/pallets by the workers is very time consuming and significantly increases the operations cost for a retailer, since these workers could be performing other tasks if they were not involved in manually inspecting the product storage areas.

BRIEF DESCRIPTION OF THE DRAWINGS

Disclosed herein are embodiments of systems, apparatuses and methods pertaining to processing captured images of objects at one or more product storage facilities. This description includes drawings, wherein.

Figure 1:
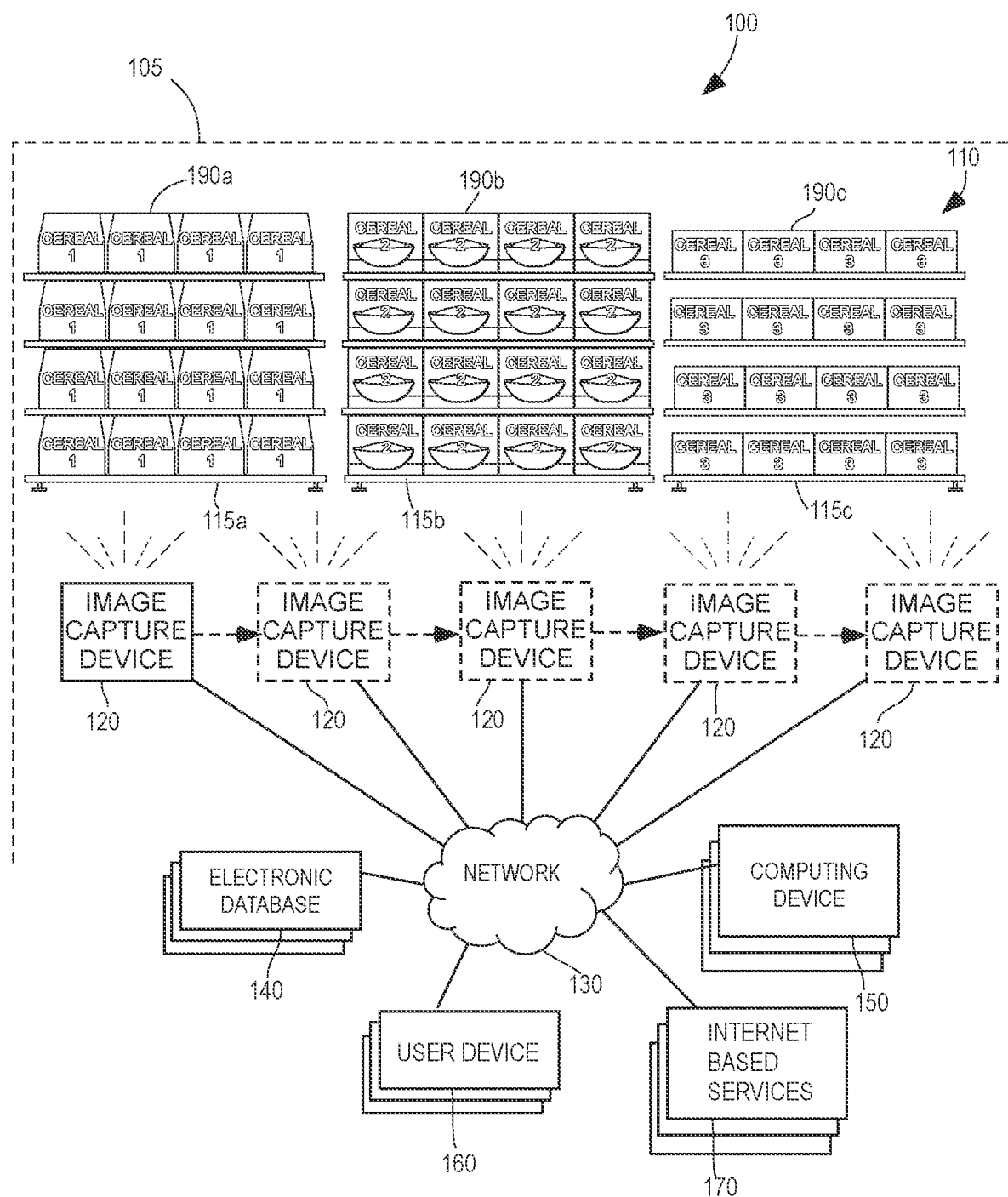
FIG. 1 is a diagram of an exemplary system of updating inventory of products at a product storage facility in accordance with some embodiments, depicting a front view of a product storage area storing groups of various individual products for sale and stored at a product storage facility.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for processing captured images of objects at a product storage facility. In some embodiments, an image processing system includes a trained machine learning model processing unprocessed captured images. In some embodiments, at least some of the unprocessed captured images depict objects in the product storage facility. The trained machine learning model may output processed images. Alternatively or in addition to, the system includes a control circuit. By one approach, the control circuit executes the trained machine learning model. In some embodiments, the control circuit associates each of the processed images into one of a first group, a second group, or a third group. In some embodiments, the first group corresponds to (a) at least one of images depicting one or more objects that are not detected by the trained machine learning model as being associated with a recognized product, (b) the images depicting the one or more objects that are not detected by the trained machine learning model as being associated with the recognized product but a recognized price tag was detected as being associated with the recognized product, and/or (c) the images depicting the one or more objects having at least one of a textual similarity or a visual similarity with a product description stored in a database but the trained machine learning model did not detect as being associated with the recognized product. In some embodiments, the second group corresponds to images depicting one or more objects that are detected by the trained machine learning model as being associated with more than one recognized product. In some embodiments, the third group corresponds to images depicting one or more objects that the trained machine learning model is unable to detect as depicting an object. In some embodiments, the control circuit removes at least one processed image associated with the first group from the processed images in accordance with a first processing rule. In some embodiments, the control circuit outputs remaining processed images associated with the first group and processed images associated with the second group to be used to retrain the trained machine learning model.

In some embodiments, a method for processing captured images of objects at a product storage facility includes processing, by a trained machine learning model, unprocessed captured images. By one approach, at least some of the unprocessed captured images depict objects in the product storage facility. Alternatively or in addition to, the method includes outputting, by the trained machine learning model, processed images. Alternatively or in addition to, the method may include associating, by a control circuit, each of the processed images into one of a first group, a second group, or a third group. By one approach, the first group may correspond to (a) at least one of images depicting one or more objects that are not detected by the trained machine learning model as being associated with a recognized product, (b) the images depicting the one or more objects that are not detected by the trained machine learning model as being associated with the recognized product but a price tag was detected as being associated with the recognized product, and/or (c) the images depicting the one or more objects having at least one of a textual similarity or a visual similarity with a product description stored in a database but the trained machine learning model did not detect as being associated with the recognized product. In some embodiments, the second group corresponds to images depicting one or more objects that are detected by the trained machine learning model 106 as being associated with more than one recognized product. In some embodiments, the third group corresponds to images depicting one or more objects that the trained machine learning model 106 is unable to detect as depicting an object. Alternatively or in addition to, the method may include removing, by the control circuit, at least one processed image associated with the first group from the processed images in accordance with a first processing rule. Alternatively or in addition to, the method may include outputting, by the control circuit, remaining processed images associated with the first group and processed images associated with the second group to be used to retrain the trained machine learning model.

FIG. 1 shows an embodiment of a system 100 of updating inventory of products for sale and stored at product storage areas 110 and/or on product storage structures 115 of a product storage facility 105 (which may be a retail store, a product distribution center, a fulfillment center, a warehouse, etc.). The system 100 is illustrated in FIG. 1 for simplicity with only one movable image capture device 120 that moves about one product storage area 110 containing three separate product storage structures 115*a,* 115*b,* and 115*c,* but it will be appreciated that, depending on the size of the product storage facility, the system 100 may include multiple movable image capture devices 120 located throughout the product storage facility that monitor hundreds of product storage areas 110 and thousands of product storage structures 115*a*-115*c.* It is understood that the movement about the product storage area 110 by the image capture device(s) 120 may depend on the physical arrangement of the product storage area 110 and/or the size and shape of the product storage structure 115. For example, the image capture device 120 may move linearly down an aisle alongside a product storage structure 115 (e.g., a shelving unit), or may move in a circular fashion around a table having curved or multiple sides.

Notably, the term "product storage structure" as used herein generally refers to a structure on which products 190*a*-190*c* are stored, and may include a rack, a pallet, a shelf cabinet, a single shelf, a shelving unit, table, rack, displays, bins, gondola, case, countertop, or another product display. Likewise, it will be appreciated that the number of individual products 190*a*-190*c* representing three exemplary distinct products (labeled as "Cereal 1," "Cereal 2," and "Cereal 3") is chosen by way of example only. Further, the size and shape of the products 190*a*-190*c* in FIG. 1 have been shown by way of example only, and it will be appreciated that the individual products 190*a*-190*c* may have various sizes and shapes. Notably, the term products 190 may refer to individual products 190 (some of which may be single-piece/single-component products and some of which may be multi-piece/multi-component products), as well as to packages or containers of products 190, which may be plastic-or paper-based packaging that includes multiple units of a given product 190 (e.g., a plastic wrap that includes 36 rolls of identical paper towels, a paper box that includes 10 packs of identical diapers, etc.). Alternatively, the packaging of the individual products 190 may be a plastic-or paper-based container that encloses one individual product 190 (e.g., a box of cereal, a bottle of shampoo, etc.).

The image capture device 120 (also referred to as an image capture unit) of the exemplary system 100 depicted in FIG. 1 is configured to move around the product storage facility (e.g., on the floor via a motorized or non-motorized wheel-based/track-based locomotion system, via slidable tracks above the floor, via a toothed metal wheel/linked metal tracks system, etc.) such that, when moving (e.g., about an aisle or other area of a product storage facility 105), the image capture device 120 has a field of view that includes at least a portion of one or more of the product storage structures 115*a*-115*c* within a given product storage area 110 of the product storage facility 105, permitting the image capture device 120 to capture multiple images of the product storage area 110 from various viewing angles. In some embodiments, the image capture device 120 is configured as a robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet-based/cloud-based service module) is configured to process such images as will be described in more detail below.

The exemplary system 100 shown in FIG. 1 includes an electronic database 140. Generally, the exemplary electronic database 140 may be configured as a single database, or a collection of multiple communicatively connected databases (e.g., digital image database, meta data database, inventory database, pricing database, customer database, vendor database, manufacturer database, etc.) and is configured to store various raw and processed images of the product storage area 110 captured by the image capture device 120 while the image capture device 120 may be moving around the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based. In some embodiments, the electronic database 140 may include one or more memory devices, computer data storage, and/or cloud-based data storage configured to store one or more of product inventories, pricing, and/or demand, and/or customer, vendor, and/or manufacturer data.

The system 100 of FIG. 1 further includes a computing device 150 configured to communicate with the electronic database 140, user devices 160, and/or internet-based services 170, and the image capture device 120 over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, portions of the network 130 are located at or in the product storage facility.

The computing device 150 may be a stationary or portable electronic device, for example, a server, a cloud-server, a series of communicatively connected servers, a computer cluster, a desktop computer, a laptop computer, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
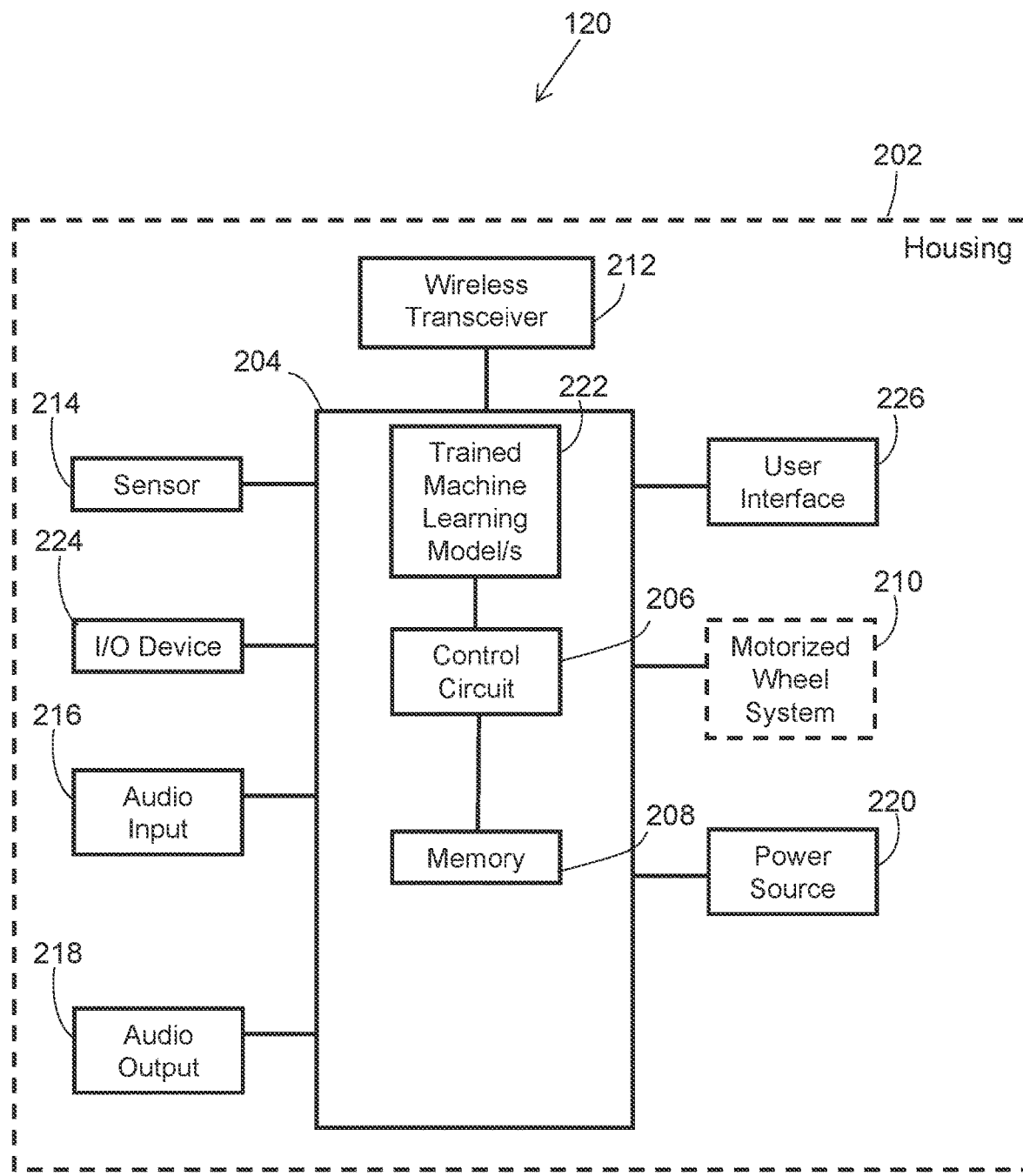
FIG. 2 comprises a block diagram of an exemplary image capture device in accordance with some embodiments.

FIG. 2 presents a more detailed example of an exemplary motorized robotic image capture device 120. As mentioned above, the image capture device 102 does not necessarily need an autonomous motorized wheel-based and/or track-based system to move around the product storage facility 105, and may instead be moved (e.g., driven, pushed, carried, worn, etc.) by a human operator, or may be movably coupled to a track system (which may be above the floor level or at the floor level) that permits the image capture device 120 to move around the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates around a horizontal axis) under power to thereby cause the image capture device 120 to move through interaction with, e.g., the floor of the product storage facility. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility. So configured, the control circuit 206 of the image capture device 120 can provide information to the computing device 150 (via the network 130) and can receive information and/or movement instructions (instructions from the computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility or other motorized image capture devices 120 moving around the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (e.g., where is pallet number so-and-so?, how many products are stocked on pallet number so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 224 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 224 may work together with or separate from any user interface implemented at an optional user interface unit or user device 160 (such as a smart phone or tablet device) usable by a worker at the product storage facility. In some embodiments, the user interface 224 is separate from the image capture device 202, e.g., in a separate housing or device wired or wirelessly coupled to the image capture device 202. In some embodiments, the user interface may be implemented in a mobile user device 160 carried by a person and configured for communication over the network 130 with the image capture device 102.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules 222 to perform at some of the functions. For example, the control circuit 206 may be trained to process one or more images of product storage areas 110 at the product storage facility 105 to detect and/or recognize one or more products 190 using one or more machine learning algorithms, including but not limited to Linear Regression, Logistic Regression, Decision Tree, SVM, Naïve Bayes, kNN, K-Means, Random Forest, Dimensionality Reduction Algorithms, Gradient Boosting Algorithms, Convolutional Neural Network (CNN), Recurrent Neural Network (RNN), Deep Neural Network (DNN), and/or algorithms associated with neural networks. In some embodiments, the trained machine learning model 222 includes a computer program code stored in a memory 208 and/or executed by the control circuit 206 to process one or more images, as described in more detail below.

It is noted that not all components illustrated in FIG. 2 are included in all embodiments of the motorized image capture device 120. That is, some components may be optional depending on the implementation of the motorized image capture device 120.

Figure 3:
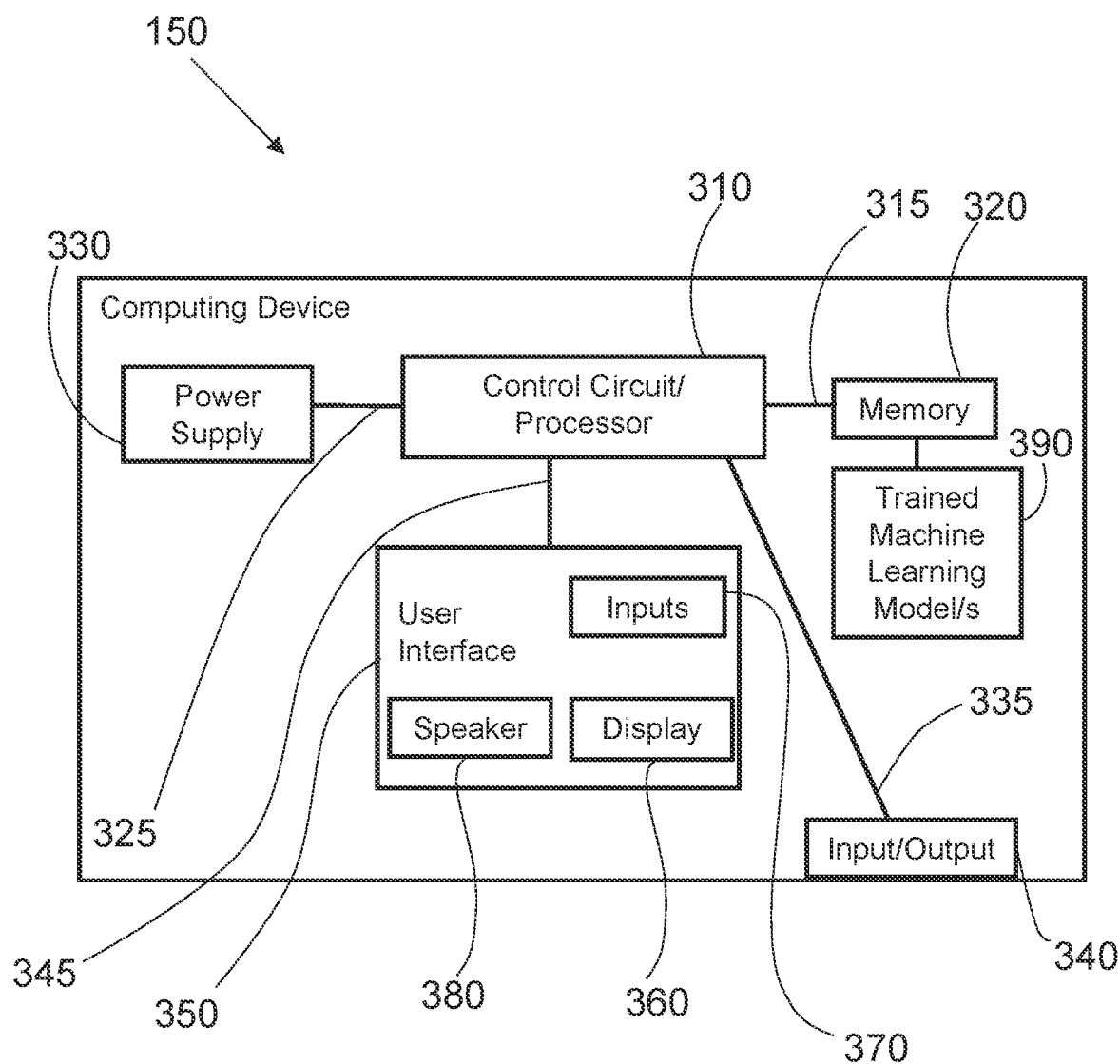
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microcontroller or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 310 of the computing device 150 is also electrically coupled via a connection 335 to an input/output 340 that can receive signals from, for example, from the image capture device 120, etc., the electronic database 140, internet-based services 170 (e.g., image processing services, computer vision services, neural network services, etc.), and/or from another electronic device (e.g., an electronic or user device of a worker tasked with physically inspecting the product storage area 110 and/or the product storage structures 115a-115c and observe the individual products 190a-190c stocked thereon. The input/output 340 of the computing device 150 can also send signals to other devices, for example, a signal to the electronic database 140 including an image of a given product storage structure 115b selected by the control circuit 310 of the computing device 150 as fully showing the product storage structure 115b and each of the products 190b stored in the product storage structure 115b. Also, a signal may be sent by the computing device 150 via the input-output 340 to the image capture device 120 to, for example, provide a route of movement for the image capture device 120 through the product storage facility.

The processor-based control circuit 310 of the computing device 150 shown in FIG. 3 may be electrically or wirelessly coupled via a connection 345 to a user interface 350, which may include a visual display or display screen 360 (e.g., LED screen) and/or button input 370 that provide the user interface 350 with the ability to permit a user (e.g., worker at a the product storage facility 105 or a worker at a remote regional center) to access the computing device 150 by inputting commands via touch-screen and/or button operation and/or voice commands. Possible commands may for example, cause the computing device 150 to cause transmission of an alert signal to an electronic mobile user device 160 of a worker at the product storage facility 105 to assign a task to the worker that requires the worker to visually inspect and/or restock a given product storage structure 115a-115c based on analysis by the computing device 150 of the image of the product storage structure 115a-115c captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 210 may be programmed to perform such functions without a human user.

As pointed out above, in some embodiments, the image capture device 120 moves around the product storage facility 105 (while being controlled remotely by the computing device 150 (or another remote device such as the user device 160), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence) multiple images of the product storage area 110 from various angles. In some aspects, the control circuit 310 of the computing device 150 obtains (e.g., from the electronic database 140 or directly from the image capture device 120) the images of the product storage area 110 captured by the image capture device 120 while moving about the product storage area 110.

The sensor 214 (e.g., digital camera) of the image capture device 120 is located and/or oriented on the image capture device 120 such that, when the image capture device 120 moves about the product storage area 110, the field of view of the sensor 214 includes only portions of adjacent product storage structures 115a-115c, or an entire product storage structure 115a-115c. In certain aspects, the image capture device 120 is configured to move about the product storage area 110 while capturing images of the product storage structures 115a-115c at certain predetermined time intervals (e.g., every 1 second, 5 seconds, 10 seconds, etc.).

The images captured by the image capture device 120 may be transmitted to the electronic database 140 for storage and/or to the computing device 150 for processing by the control circuit 310 and/or to a web-/cloud-based image processing service 170. In some embodiments, one or more of the image capture devices 120 of the exemplary system 100 depicted in FIG. 1 is mounted on or coupled to a motorized robotic unit similar to the motorized robotic image capture device 120 of FIG. 2.

In some embodiments, one or more of the image capture devices 120 of the exemplary system 100 depicted in FIG. 1 is configured to be stationary or mounted to a structure, such that the image capture device 120 may capture one or more images of an area having one or more products at the product storage facility. For example, the area may include a product storage area 110, and/or a portion of and/or an entire product storage structures 115a-115c of the product storage facility.

In some embodiments, the electronic database 140 stores data corresponding to the inventory of products in the product storage facility. The control circuit 310 processes the images captured by the image capture device 120 and causes an update to the inventory of products in the electronic database 140. In some embodiments, one or more steps in the processing of the images are via machine learning and/or computer vision models that may include one or more trained neural network models. In certain aspects, the neural network may be a deep convolutional neural network. The neural network may be trained using various data sets, including, but not limited to: raw image data extracted from the images captured by the image capture device 120; metadata extracted from the images captured by the image capture device 120; reference image data associated with reference images of various product storage structures 115a-115c at the product storage facility; reference images of various products 190a-190c stocked and/or sold at the product storage facility; and/or planogram data associated with the product storage facility.

Figure 4:
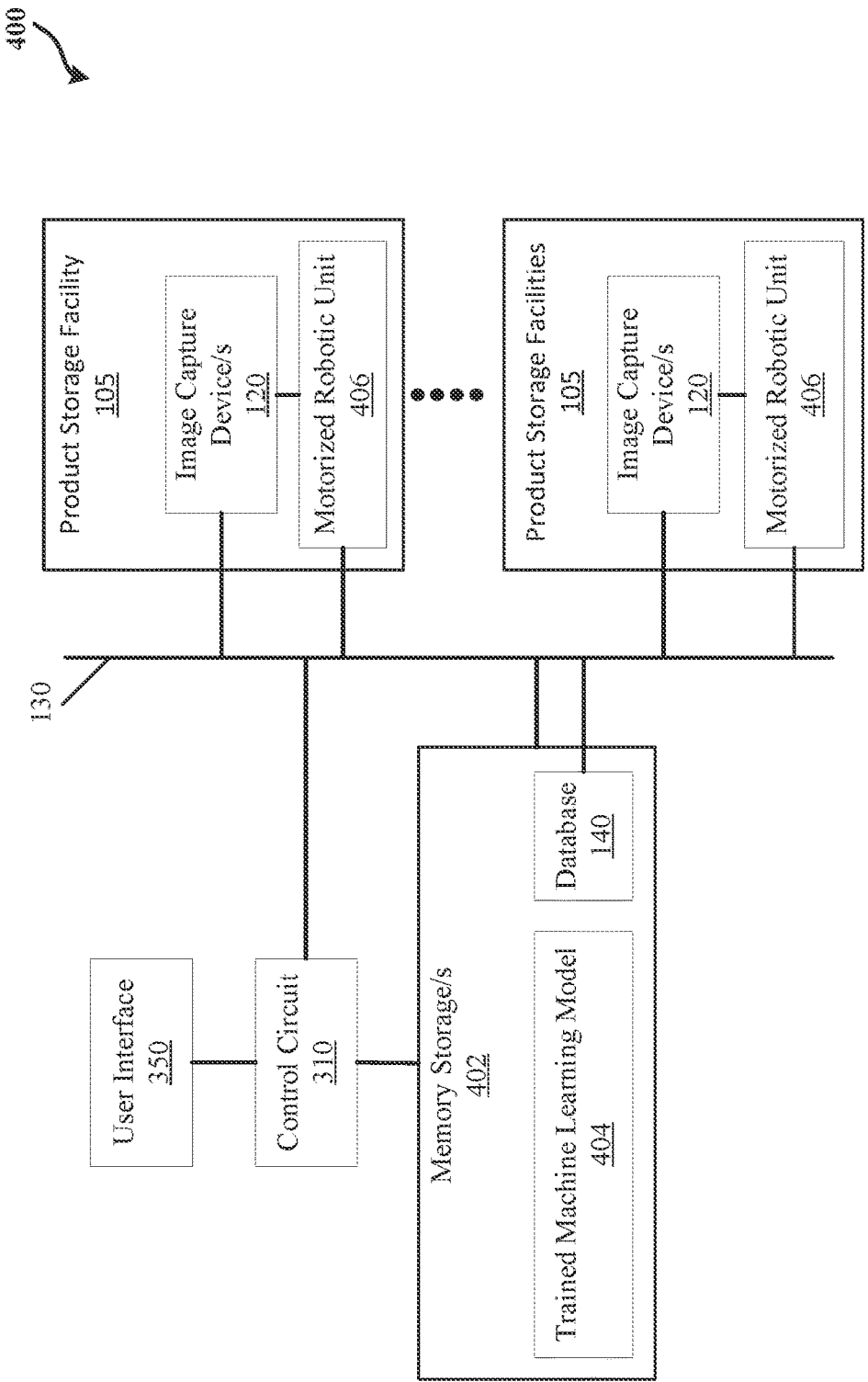
FIG. 4 illustrates a simplified block diagram of an exemplary system for processing captured images of objects at one or more product storage facilities in accordance with some embodiments.
Figure 5A:
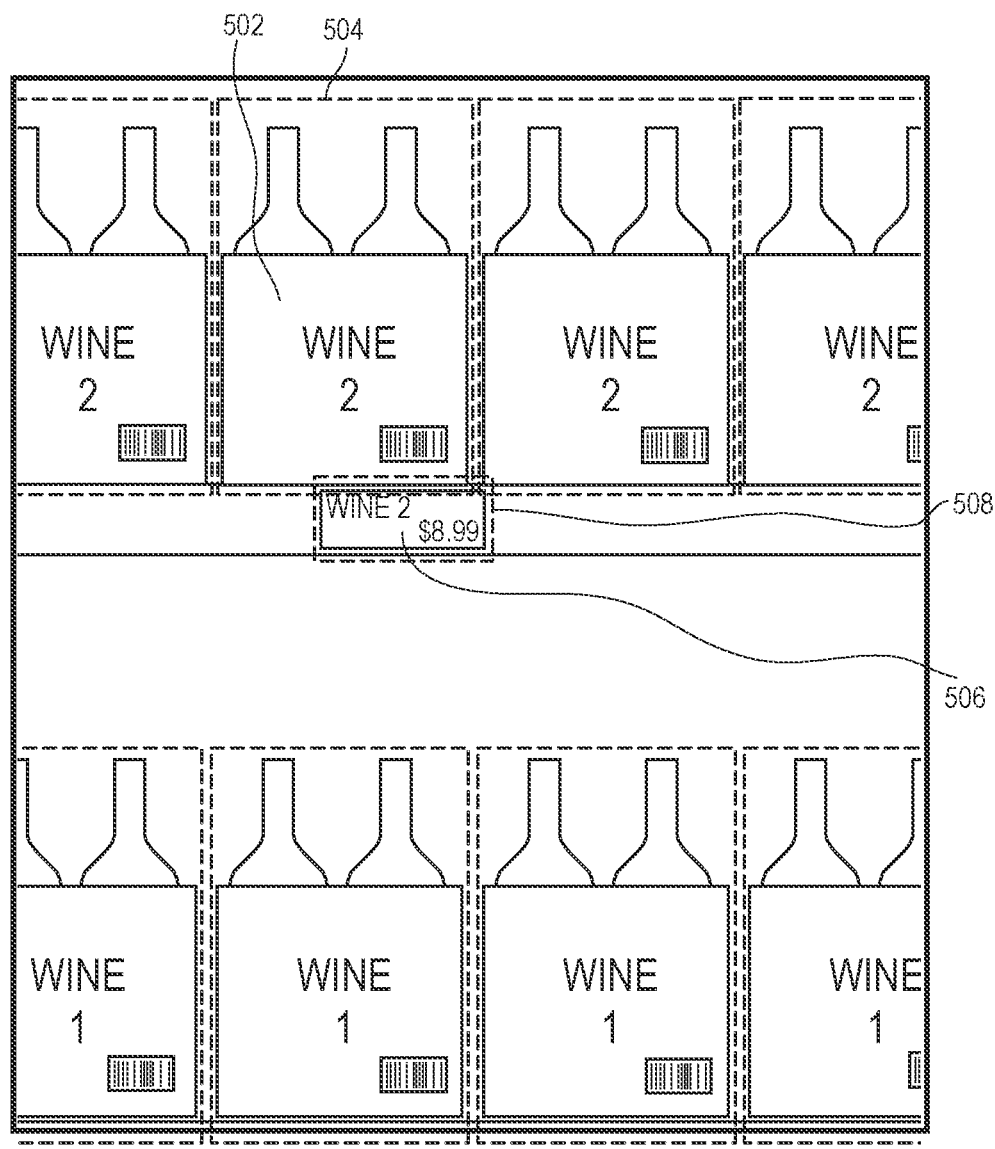
FIG. 5A depicts an exemplary processed image in accordance with some embodiments.
Figure 5B:
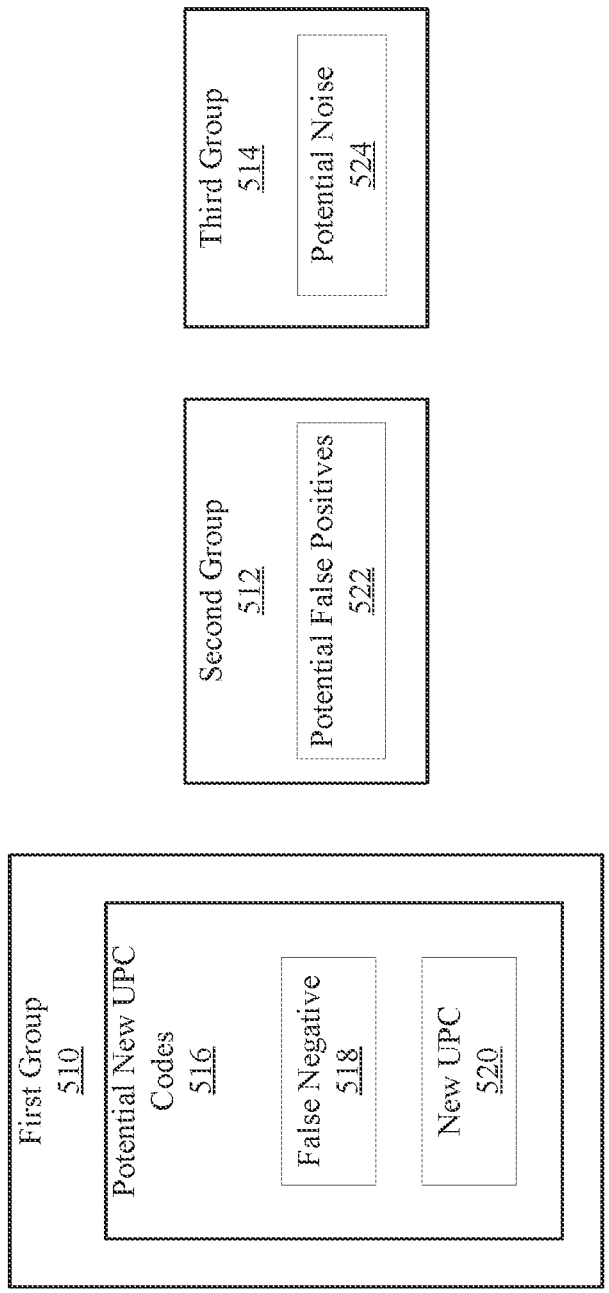
FIG. 5B illustrates exemplary grouping of process images in accordance with some embodiments.

FIG. 4 is described below along with FIGS. 5A through 5F. FIG. 4 illustrates a simplified block diagram of an exemplary system for processing captured images of objects at one or more product storage facilities in accordance with some embodiments. FIGS. 5A depicts an exemplary processed image in accordance with some embodiments. FIG. 5B illustrates exemplary grouping of process images in accordance with some embodiments. FIGS. 5C through 5F depict exemplary images of first group, second group, and third group in accordance with some embodiments. The system 400 includes a control circuit 310. Alternatively or in addition to, the system 400 may include memory storage/s 402, a user interface 350, and/or product storage facilities 105 coupled via a network 130. In some embodiments, the memory storage/s 402 may be one or more of a cloud storage network, a solid state drive, a hard drive, a random access memory (RAM), a read only memory (ROM), and/or any storage devices capable of storing electronic data, or any combination thereof. In some embodiments, the memory storage/s 402 includes the memory 320. In such an embodiment, a trained machine learning model 404 includes trained machine learning model/s 390. In some embodiments, the memory storage/s 402 is separate and distinct from the memory 320. In such an embodiment, the trained machine learning model 404 may be associated with the trained machine learning model/s 390. For example, the trained machine learning model/s 390 may be a copied version of the trained machine learning model 404. Alternatively or in addition to, the trained machine learning model 222 may be a copied version of the trained machine learning model 404. In some embodiments, the processing of unprocessed captured images is processed by the trained machine learning model 222.

In some embodiments, the memory storage/s 402 includes a trained machine learning model 404 and/or a database 140. In some embodiments, the database 140 may be an organized collection of structured information, or data, typically stored electronically in a computer system (e.g. the system 100). In some embodiments, the database 140 may be controlled by a database management system (DBMS). In some embodiments, the DBMS may include the control circuit 310. In yet some embodiments, the DBMS may include another control circuit (not shown) separate and/or distinct from the control circuit 310.

In some embodiments, the control circuit 310 may be communicatively coupled to the trained machine learning model 404 including one or more trained computer vision/machine learning/neural network modules to perform at some or all of the functions described herein. For example, the control circuit 310 using the trained machine learning model 404 may be trained to process one or more images of product storage areas (e.g., aisles, racks, shelves, pallets, to name a few) at product storage facilities 105 to detect and/or recognize one or more products for purchase using one or more machine learning algorithms, including but not limited to Linear Regression, Logistic Regression, Decision Tree, SVM, Naïve Bayes, kNN, K-Means, Random Forest, Dimensionality Reduction Algorithms, Gradient Boosting Algorithms, Convolutional Neural Network (CNN), Recurrent Neural Network (RNN), Deep Neural Network (DNN), and/or algorithms associated with neural networks. In some embodiments, the trained machine learning model 404 includes a computer program code stored in the memory storage/s 402 and/or executed by the control circuit 310 to process one or more images, as described herein.

The product storage facility 105 may include one of a retail store, a distribution center, and/or a fulfillment center. In some embodiments, a user interface 350 includes an application stored in a memory (e.g., the memory 320 or the memory storage/s 402) and executable by the control circuit 310. In some embodiments, the user interface 350 may be coupled to the control circuit 310 and may be used by a user to at least one of associate a product with at least one depicted object in processed images or resolve that one or more objects depicted in the images is only associated with a single product. In some embodiments, an output of the user interface 350 is used to retrain the trained machine learning model 404.

In some embodiments, the trained machine learning model 404 processes unprocessed captured images. For example, unprocessed captured images may include images captured by and/or output by the image capture device/s 120. Alternatively or in addition to, the unprocessed captured images may include images that have not gone through object detection or object classification by the control circuit 310. In some embodiments, at least some of the unprocessed captured images depict objects in the product storage facility 105.

In some embodiments, the trained machine learning model 404 outputs processed images. In some embodiments, one or more of the processed images depict at least one or both of an object 502 inside a bounding box 504 and a price tag 506 inside a bounding box 508. It is understood that the item shown as the object 502 and the price shown in the price tag 506 are only for illustrative purposes.

In some embodiments, the control circuit 310 associates each of the processed images into one of a first group 510, a second group 512, or a third group 514. For example, the first group 510 may include potential new UPC codes 516 or new product identifiers (e.g., UPC code, QR code, to name a few). In some embodiments, the first group 510 corresponds to at least one of images depicting one or more objects that are not detected by the trained machine learning model 404 as being associated with a recognized product. For example, an item corresponding to the depicted object may not be one of those items for which the trained machine learning model 404 have training data (e.g., an item belonging to a product newly inventoried in the product storage facility 105) as represented by New UPC 520. Another example, the trained machine learning model 404 may have sufficient training data but is unable to associate or detect the item as a recognized or classified product as represented by False Negative 518.

In some embodiments, the first group 510 may include images depicting one or more objects that are not detected by the trained machine learning model 404 as being associated with the recognized product but a recognized price tag was detected as being associated with the recognized product as additionally represented by the New UPC 520. In an illustrative non-limiting example, the trained machine learning model 404 may search the database 140 for images that may match the one or more depicted objects and/or for images that may match the price tag. The search may not result in a match with the one or more depicted objects, but a match with the price tag may have been found.

In some embodiments, the first group 510 may include images depicting one or more objects having at least one of a textual similarity or a visual similarity with a product description stored in the database 140 but the trained machine learning model 404 did not detect as being associated with a recognized product. For example, the trained machine learning model 404 may search for images with boundary boxes including target UPCs (e.g., UPC codes or product identifiers for which there are product descriptions but no training images) using an optical character recognition (OCR) similarity/textual similarity. In some embodiments, training images (may also be referred to as training data or training dataset) are a plurality of images stored in the database 140. The training images may be used to train the trained machine learning model 404. For example, the training images may include a plurality of set of images. In such an example, each set of images may correspond to a representative set of images for a particular UPC or product identifier that the trained machine learning model 404 is trained on to identify or recognize that a particular object or item is associated with the particular UPC or product identifier.

In an illustrative non-limiting example, the trained machine learning model 404 may process captured images by augmenting the captured images with boundary boxes around objects to indicate that the trained machine learning model 404 has matched product descriptions stored in the database 140 that correspond to the text detected on the objects. In another illustrative non-limiting example, the trained machine learning model 404 may process the captured images by detecting a plurality of objects in the captured image but has determined that there are no matching product descriptions stored in the database 140 and/or that the matched product descriptions are less than a threshold. The threshold may be a predefined value. For example, the threshold may correspond to a value previously tuned or optimized by conducting experiments on sample image data that maximizes the number of correct product matches (e.g., correct matching of an object or an item to a product identifier, such as UPC code for example) by a human.

In some embodiments, the second group 512 corresponds to images depicting one or more objects that are detected by the trained machine learning model 404 as being associated with more than one recognized product, for example, as represented by Potential False Positives 522. For example, the trained machine learning model 404 may process captured images by augmenting the captured images with boundary boxes around objects to indicate that the trained machine learning model 404 has detected a plurality of objects in the captured image, for example, by using a known edge detection technique. A person of ordinary skilled in the art understands the various known methods and processing techniques in implementing edge detection when processing captured images. As such, further explanation of the edge detection technique is not necessary. In an illustrative non-limiting example, the trained machine learning model 404 may determine that there are a plurality of objects in a processed image for which the trained machine learning model 404 has determined that there are at least two items in the plurality of objects that are associated with two different UPCs or product identifiers. In another illustrative non-limiting example, the trained machine learning model 404 may determine that there is a match with the one or more depicted objects either textually and/or visually with a recognized product stored in the database 140 (e.g., a product with a corresponding UPC or product identifier), but the trained machine learning model 404 may also have a match on a detected price tag with another recognized product stored in the database 140. In some embodiments, the trained machine learning model 404 may output processed images associated with the second group 512 to be used to retrain the trained machine learning model 404. Alternatively or in addition to, a user may use the user interface 350 to resolve that one or more objects depicted in the images associated with the second group is only associated with a single product.

In some embodiments, the third group 514 corresponds to images depicting one or more objects that the trained machine learning model 404 is unable to detect as depicting an object as represented by Potential Noise 524, for example. In some embodiments, the trained machine learning model 404 may process captured images by augmenting the captured images with boundary boxes around objects to indicate that the trained machine learning model 404 has detected a plurality of objects in the captured image, for example, by using a known edge detection technique as previously described. However, the trained machine learning model 404 may not be able to associate any one of the objects in the boundary boxes as being associated with a recognized product either textually and/or visually, for example. In another example, the trained machine learning model 404 may determine that none of the objects in the boundary boxes is associated with a recognized product using depth information technique. For example, using the depth information technique, the trained machine learning model 404 determines whether the bounding boxes are of objects placed at the front or in shelves behind. In some embodiments, the trained machine learning model 404 may include openly available depth estimation machine learning models to determine whether the bounding boxes are of objects placed at the front or in shelves behind. In some embodiments, the control circuit 310 removes the images associated with the third group 514 from the processed images.

In some embodiments, the control circuit 310 removes at least one processed image associated with the first group 510 from the processed images in accordance with a first processing rule. In some embodiments, the first processing rule includes removing images that are similar to previously processed images based on at least one of the textual similarity, the visual similarity, and/or a location similarity where the previously processed images were captured. For example, a similarity score may be computed by the control circuit 310 as a mathematical function of the visual, textual and/or location similarity designed in such a way as to maximize the correct False Negative matches. In an illustrative non-limiting example, the database 140 may store images and/or metadata of such images associated with the False Negative 518. In such example, the control circuit 310 using the trained machine learning model 404 may filter out images associated with the potential new UPC codes 516 or new product identifiers that have similar location metadata and/or textual similarity as those images stored in the database 140 that are associated with the False Negative 518. In some embodiments, the control circuit 310 outputs remaining processed images associated with the first group 510. In an illustrative non-limiting example, the user interface 350 may be used by a user to associate a product with at least one depicted object in the remaining processed images associated with the first group 510.

Figure 5C:
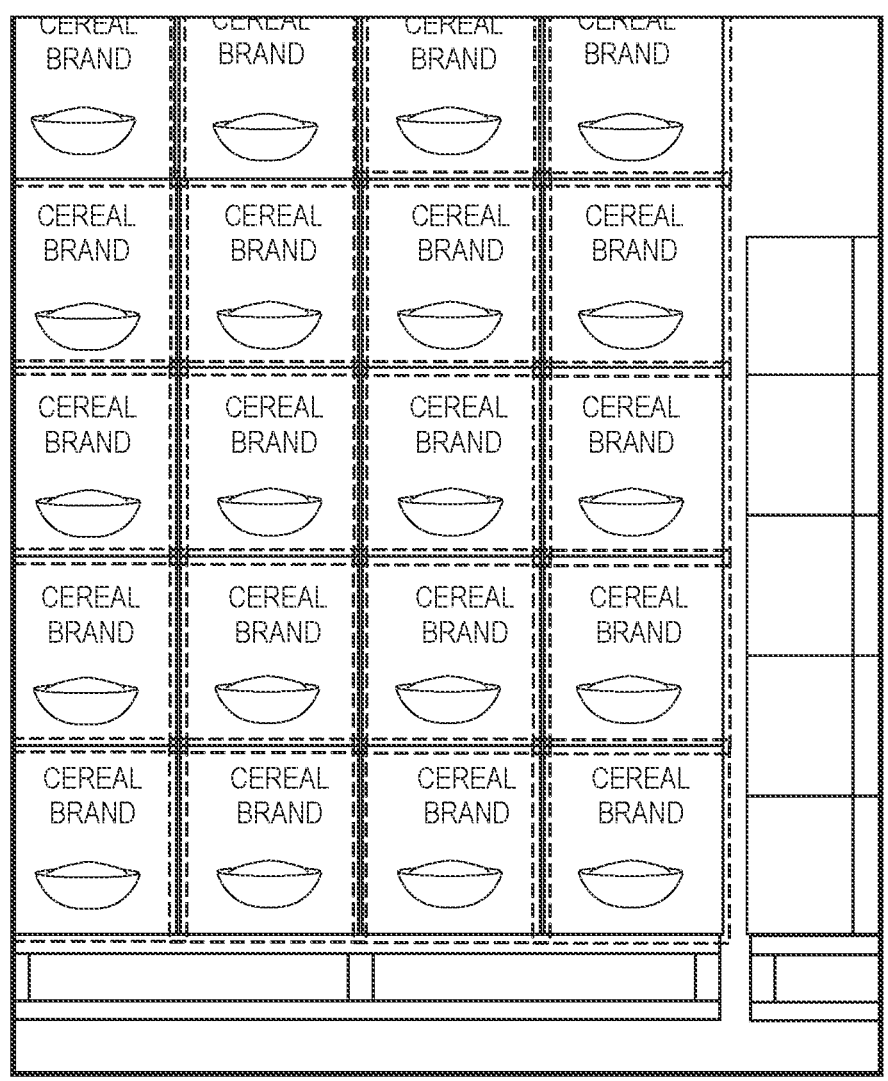
FIGS. 5C through 5F depict exemplary images of first group, second group, and third group in accordance with some embodiments.
Figure 5D:
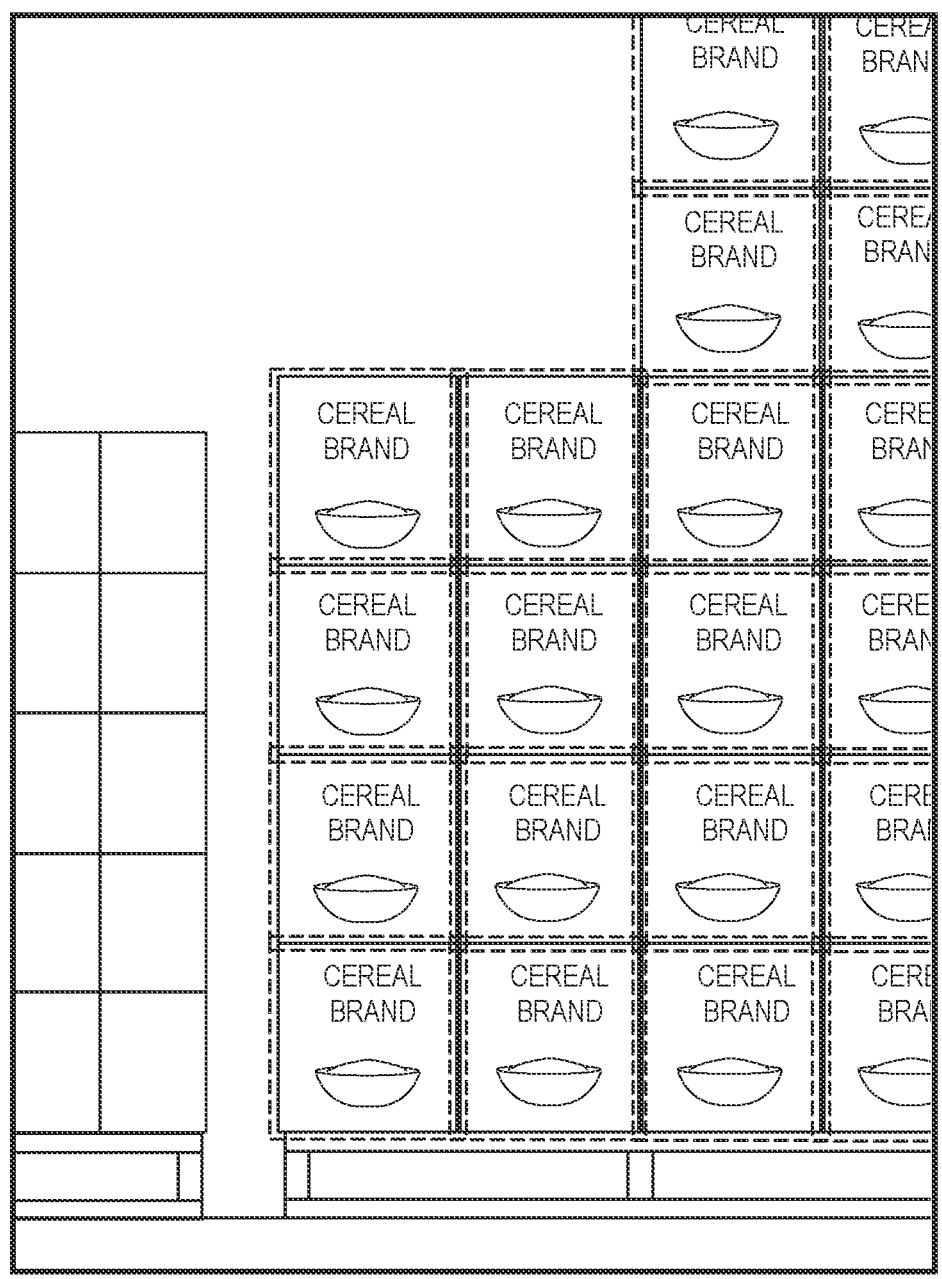
Figure 5E:
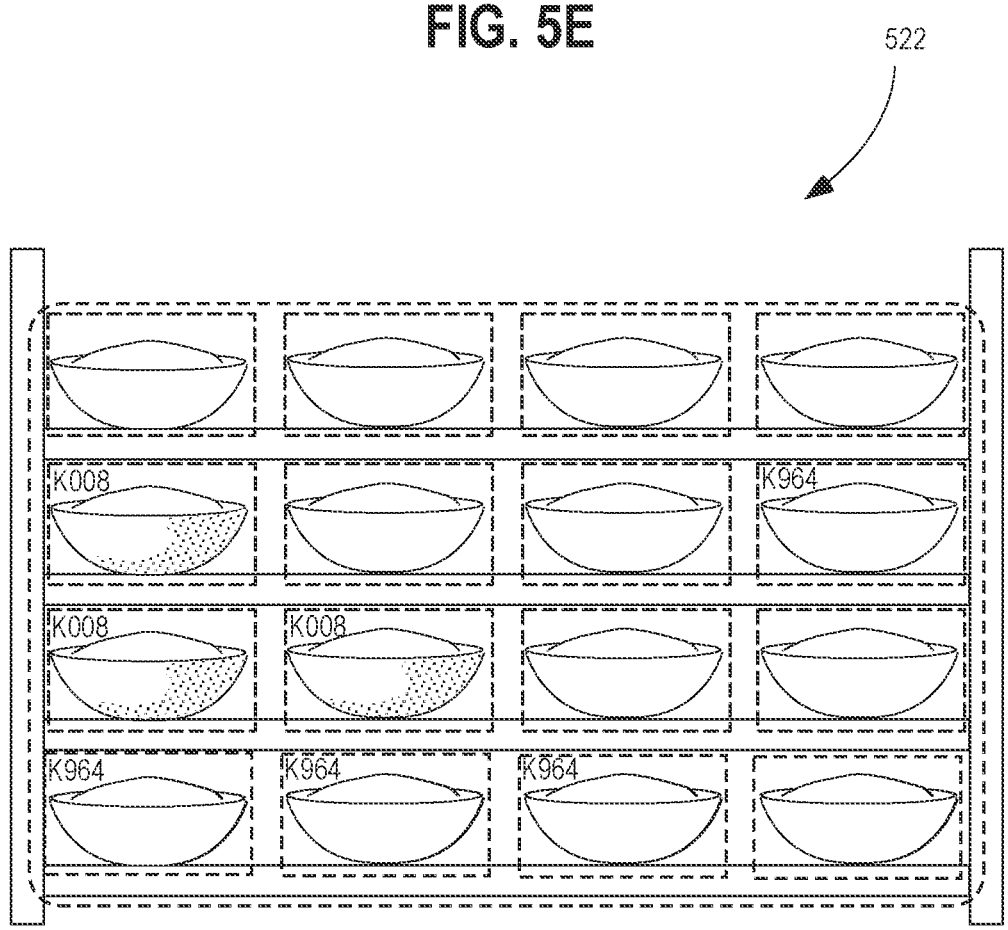
Figure 5F:
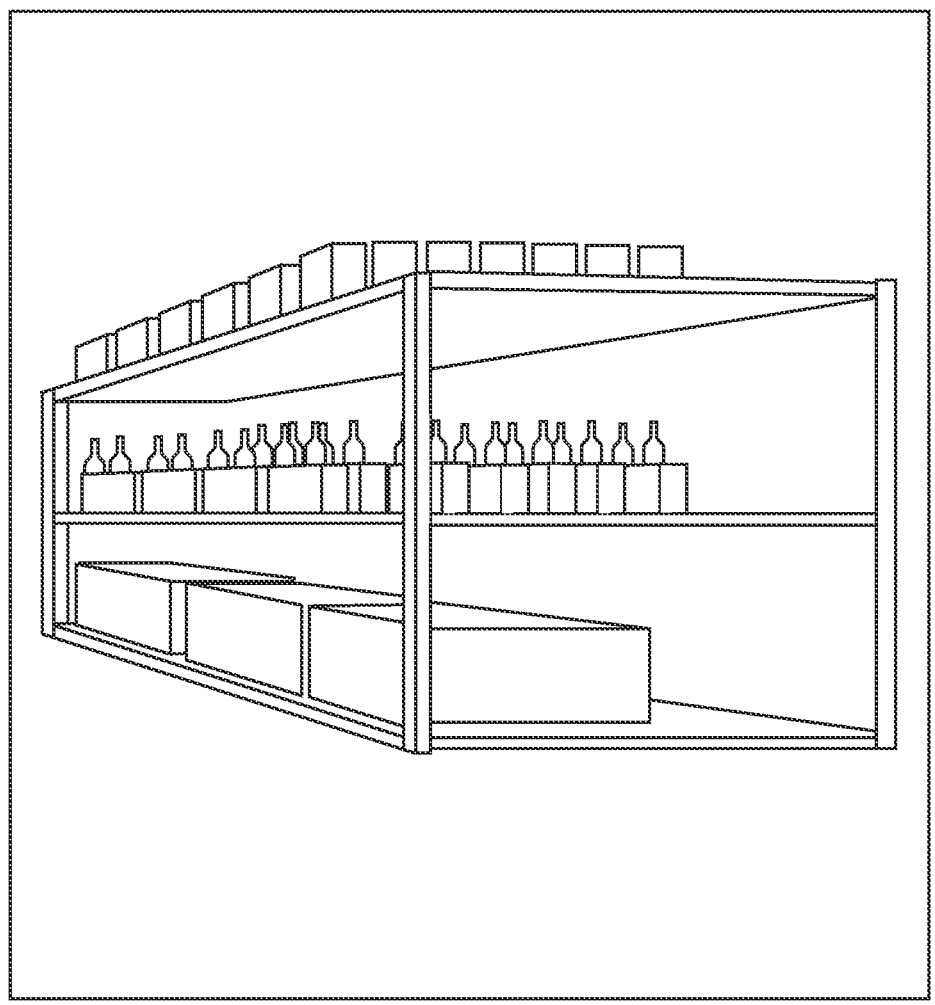

FIGS. 5C through 5F depicts exemplary images of the first group 510, the second group 512, and the third group 514. FIG. 5C is an exemplary image of the False Negative 518. In the image, the trained machine learning model 404 has detected that there are a plurality of objects in the image, but unable to associate anyone of the plurality of objects to a recognized product. FIG. 5D is an exemplary image of the New UPC 520. FIG. 5E is an exemplary image of the Potential False Positives 522. In FIG. 5E, the model indicates that the image contains multiple products (identified as product identifiers K008 and K964) but all appear to be the same product. FIG. 5F is an exemplary image of the Potential Noise 524, i.e, no products are identifiable.

Figure 6:
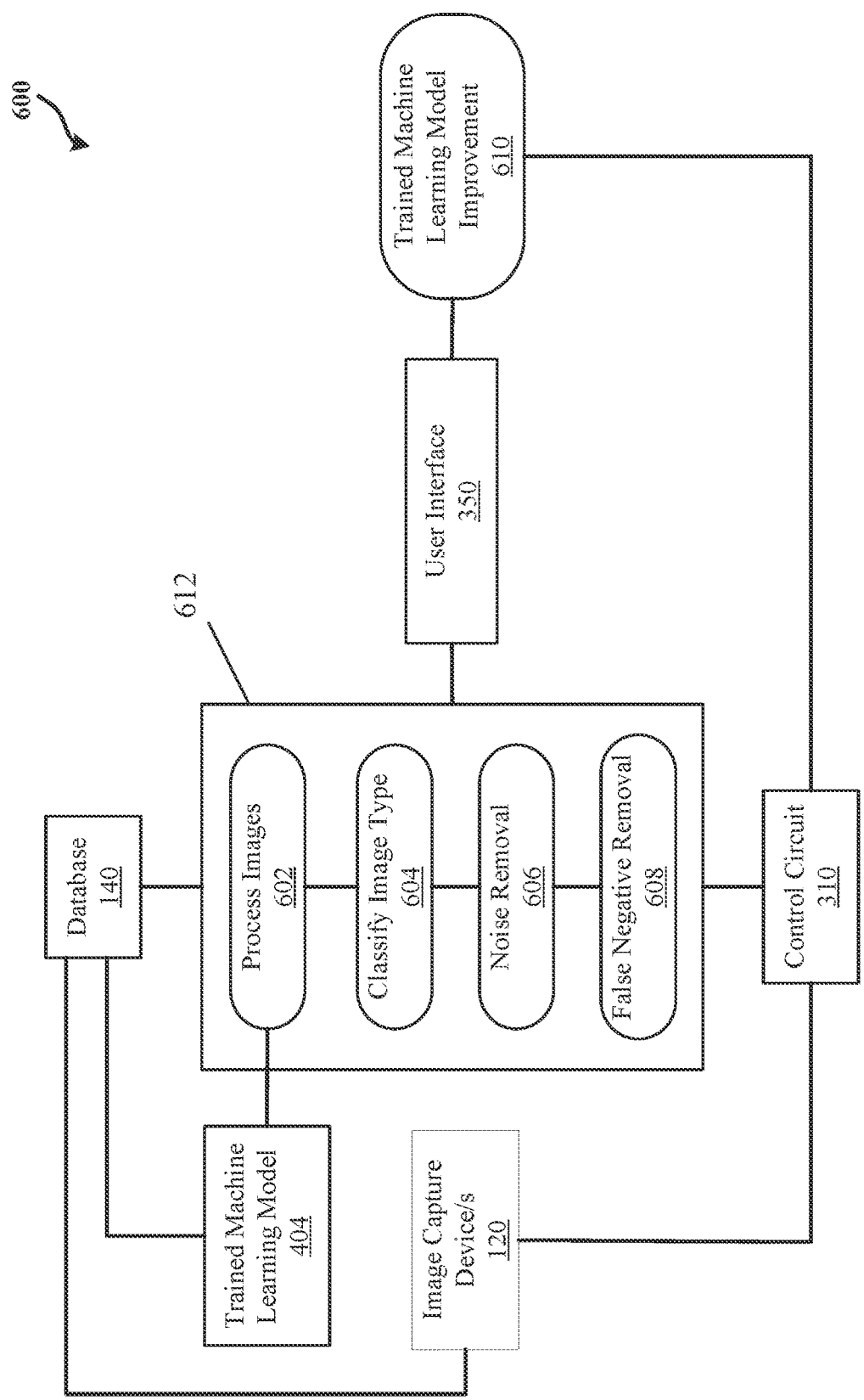
FIG. 6 illustrates a simplified block diagram of an exemplary system for processing captured images of objects at one or more product storage facilities in accordance with some embodiments.
Figure 7:
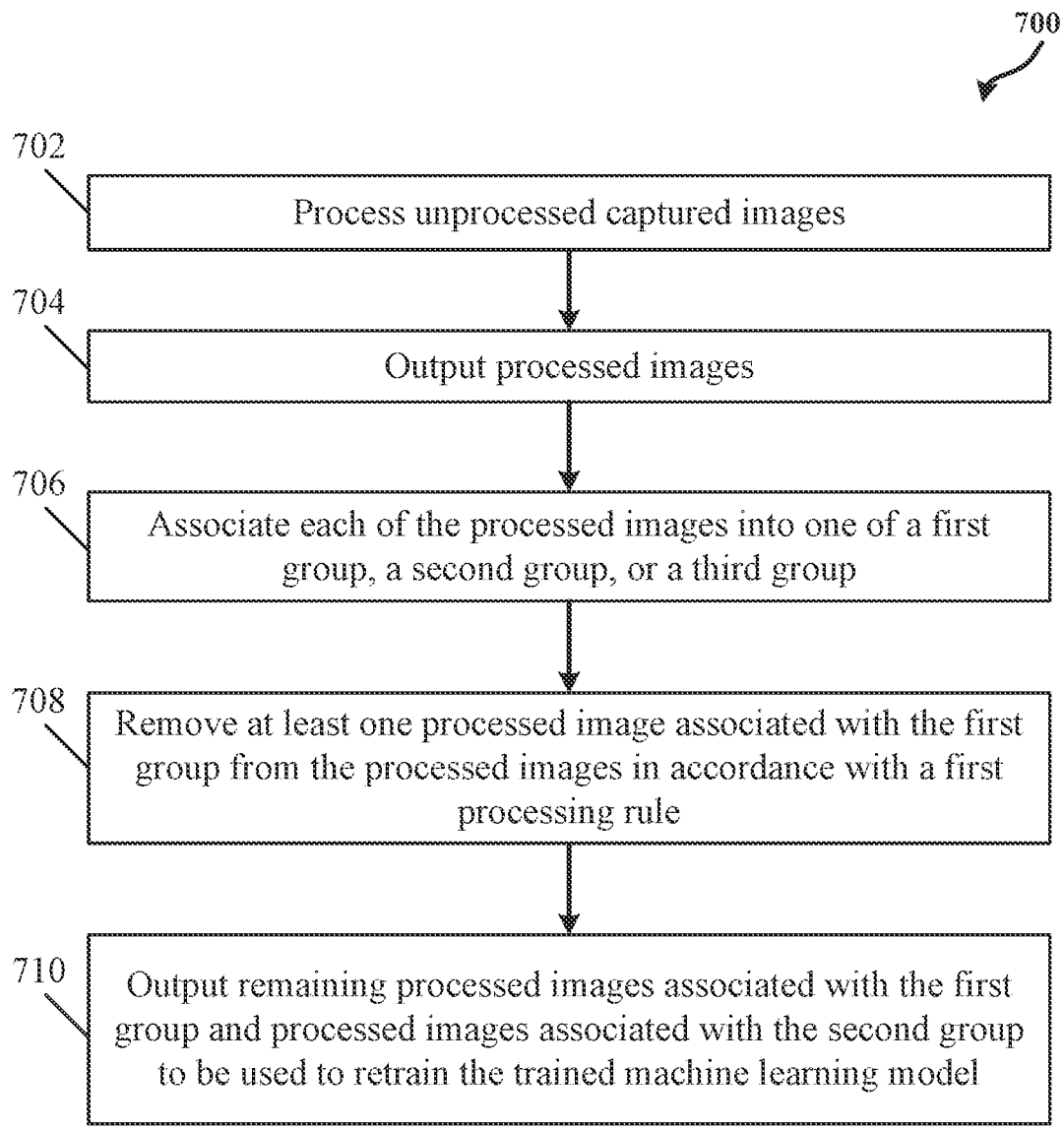
FIG. 7 shows a flow diagram of an exemplary method of processing captured images of objects at one or more product storage facilities in accordance with some embodiments.

FIG. 6 is described along with FIG. 7. FIG. 6 illustrates a simplified block diagram of an exemplary system 600 for processing captured images of objects at one or more product storage facilities in accordance with some embodiments. FIG. 7 shows a flow diagram of an exemplary method 700 of processing captured images of objects at one or more product storage facilities in accordance with some embodiments. The system 600 includes the control circuit 310, the image capture device/s 120, the trained machine learning model 404, the database 140, and/or the user interface 350.

In some embodiments, the control circuit 310 executes a feedback loop 612 to automatically identify images depicting objects that are associated with new product identifiers, images that the trained machine learning model 404 has incorrectly predicted as being associated with recognized product identifiers, and/or images that the trained machine learning model 404 has not detected objects depicted in the images as being associated with the recognized product identifiers. In an illustrative non-limiting example, the trained machine learning model 404, at 602, processes images. The processing of images may include processing unprocessed captured images of the image capture device/s 120 and outputs processed images to the database 140 and/or the control circuit 310 as shown at steps 702 and 704, respectively. In some embodiments, others of the unprocessed captured images depict objects at one or more additional product storage facilities 105.

Alternatively or in addition to, the feedback loop 612, at 604, may include classifying image type. In some embodiments, the classification of image type includes associating each of the processed images into one of a first group, a second group, or a third group as shown at step 706. Alternatively or in addition to, the feedback loop 612, at 606, may include noise removal. In some embodiments, the noise removal includes removing at least one processed image associated with the first group from the processed images in accordance with a first processing rule as shown at step 708. The first processing rule allows the control circuit using the trained machine learning model 404 to automatically remove images that are similar to previously processed images based on at least one of the textual similarity, the visual similarity, and/or a location similarity where the previously processed images were captured; thereby causing an update on a dataset that the trained machine learning model 404 used to be retrained. For example, the updated dataset may include images having objects associated with new product identifiers. Alternatively or in addition to, the feedback loop 612, at 608, may include false negative removal. In some embodiments, the false negative removal includes removing the images associated with the third group from the processed images.

Alternatively or in addition to, the control circuit 310, at 610, may output the remaining processed images associated with the first group and/or processed images associated with the second group to be used to retrain the trained machine learning model as shown at step 710. In some embodiments, the output may subsequently cause an update on a dataset that the trained machine learning model 404 is used to be retrained. In yet some embodiments, the user interface 350 receives the output of the control circuit 310. For example, the user interface 350 is used as manual feedback to resolve that the image is really a known UPC (false negative), the image is a new UPC (new UPC), the images having multiple UPCs are actually just one UPC (false positive), for example. The output of the user interface 350 may be then used to retrain the trained machine learning model 404.

Figure 8:
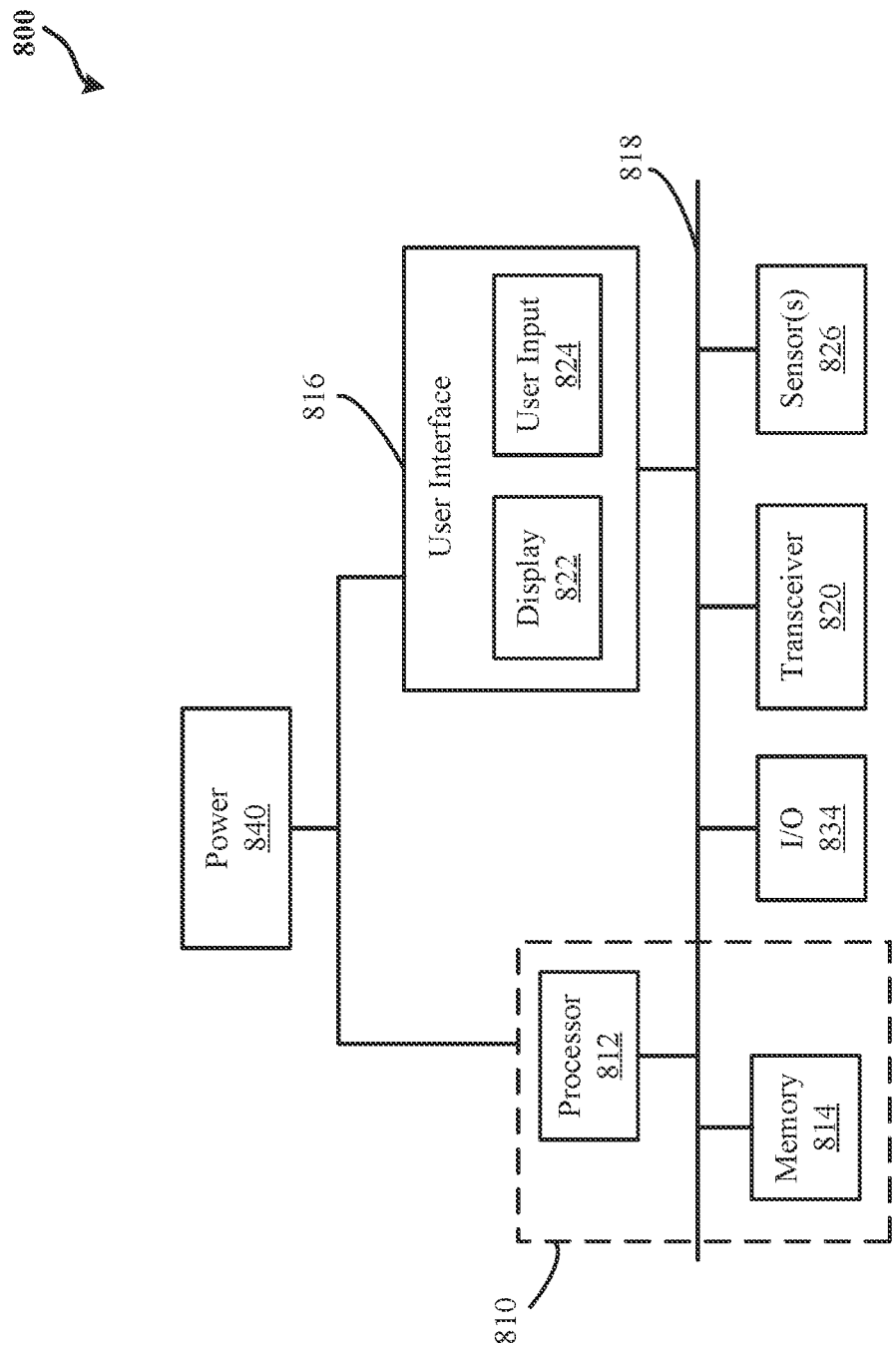
FIG. 8 illustrates an exemplary system for use in implementing methods, techniques, devices, apparatuses, systems, servers, sources and processing captured images of objects at one or more product storage facilities, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 8 illustrates an exemplary system 800 that may be used for implementing any of the components, circuits, circuitry, systems, functionality, apparatuses, processes, or devices of the system 100 of FIG. 1, the movable image capture device 120 of FIG. 2, the computing device 150 of FIG. 3, the system 400 of FIG. 4, the system 600 of FIG. 6, the method 700 of FIG. 7, and/or other above or below mentioned systems or devices, or parts of such circuits, circuitry, functionality, systems, apparatuses, processes, or devices. For example, the system 800 may be used to implement some or all of the systems 100 and 400 for processing captured images of objects at a product storage facility, the user interface 350, the control circuit 310, the memory storage/s 402, the database 140, the network 130, the image capture device/s 120 and the motorized robotic unit 406, and/or other such components, circuitry, functionality and/or devices. However, the use of the system 800 or any portion thereof is certainly not required.

By way of example, the system 800 may comprise a processor module (or a control circuit) 812, memory 814, and one or more communication links, paths, buses or the like 818. Some embodiments may include one or more user interfaces 816, and/or one or more internal and/or external power sources or supplies 840. The control circuit 812 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 812 can be part of control circuitry and/or a control system 810, which may be implemented through one or more processors with access to one or more memory 814 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 800 may be used to implement one or more of the above or below, or parts of, components, circuits, systems, processes and the like. For example, the system 800 may implement the system for processing captured images of objects at a product storage facility 105 with the control circuit 310 being the control circuit 812.

The user interface 816 can allow a user to interact with the system 800 and receive information through the system. In some instances, the user interface 816 includes a display 822 and/or one or more user inputs 824, such as buttons, touch screen, track ball, keyboard, mouse, etc., which can be part of or wired or wirelessly coupled with the system 800. Typically, the system 800 further includes one or more communication interfaces, ports, transceivers 820 and the like allowing the system 800 to communicate over a communication bus, a distributed computer and/or communication network (e.g., a local area network (LAN), the Internet, wide area network (WAN), etc.), communication link 818, other networks or communication channels with other devices and/or other such communications or combination of two or more of such communication methods. Further the transceiver 820 can be configured for wired, wireless, optical, fiber optical cable, satellite, or other such communication configurations or combinations of two or more of such communications. Some embodiments include one or more input/output (I/O) interface 834 that allow one or more devices to couple with the system 800. The I/O interface can be substantially any relevant port or combinations of ports, such as but not limited to USB, Ethernet, or other such ports. The I/O interface 834 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 826 to provide information to the system and/or sensor information that is communicated to another component, such as the user interface 350, the control circuit 310, the memory storage/s 402, the database 140, the network 130, the image capture device/s 120, and the motorized robotic unit 406, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 800 comprises an example of a control and/or processor-based system with the control circuit 812. Again, the control circuit 812 can be implemented through one or more processors, controllers, central processing units, logic, software and the like. Further, in some implementations the control circuit 812 may provide multiprocessor functionality.

The memory 814, which can be accessed by the control circuit 812, typically includes one or more processor readable and/or computer readable media accessed by at least the control circuit 812, and can include volatile and/or nonvolatile media, such as RAM, ROM, EEPROM, flash memory and/or other memory technology. Further, the memory 814 is shown as internal to the control system 810; however, the memory 814 can be internal, external or a combination of internal and external memory. Similarly, some or all of the memory 814 can be internal, external or a combination of internal and external memory of the control circuit 812. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 814 can store code, software, executables, scripts, data, content, lists, programming, programs, log or history data, user information, customer information, product information, and the like. While FIG. 8 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for processing captured images of objects at a product storage facility, the system comprising:
 a trained machine learning model configured to:
  process unprocessed captured images, wherein at least some of the unprocessed captured images depict objects in the product storage facility; and
  output processed images; and
 a control circuit configured to:
  associate each of the processed images into one of a first group, a second group, or a third group,
   wherein the first group corresponds to at least one of (a) images depicting one or more objects that are not detected by the trained machine learning model as being associated with a recognized product but a recognized price tag was detected as being associated with the recognized product, or (b) images depicting the one or more objects having at least one of a textual similarity or a visual similarity with a product description stored in a database but the trained machine learning model did not detect as being associated with the recognized product,
   wherein the second group corresponds to images depicting one or more objects that are detected by the trained machine learning model as being associated with more than one recognized product, and
   wherein the third group corresponds to images depicting one or more objects that the trained machine learning model is unable to detect as depicting an object;
  remove the images associated with the third group from the processed images;
  calculate a similarity score for each of the processed images in the first group, each similarity score representing the textual similarity or the visual similarity between the processed image and previously processed images stored in the database that are associated with false-negatives;
  remove at least one processed image from the first group based on the similarity score for the at least one processed image; and
  output remaining processed images associated with the first group and processed images associated with the second group to be used to retrain the trained machine learning model.

2. The system of claim 1, further comprising:
 one or more image capture devices configured to capture images of the objects in the product storage facility; and
 the database configured to store at least one of the unprocessed captured images and the processed images.

3. The system of claim 2, wherein at least one of the one or more image capture devices is coupled to a motorized robotic unit.

4. The system of claim 1, wherein one or more of the processed images depict at least one or both of an object inside a bounding box and a price tag inside a bounding box.

5. The system of claim 1, further comprising a user interface coupled to the control circuit, wherein the user interface is configured to be used by a user to at least one of associate a product with at least one depicted object in the remaining processed images associated with the first group or resolve that one or more objects depicted in the images associated with the second group is only associated with a single product, wherein an output of the user interface is used to retrain the trained machine learning model.

6. The system of claim 1, wherein the unprocessed captured images comprise images that have not gone through object detection or object classification by the control circuit.

7. The system of claim 1, wherein removing the at least one processed image associated with the first group from the processed images can further include removing processed images that are similar to the previously processed images based on a location similarity with where the previously processed images were captured.

8. The system of claim 1, wherein others of the unprocessed captured images depict objects at one or more additional product storage facilities.

9. The system of claim 1, wherein the product storage facility comprises one of a retail store, a distribution center, and a fulfillment center.

10. A method for processing captured images of objects at a product storage facility, the method comprising:
 processing, by a trained machine learning model, unprocessed captured images, wherein at least some of the unprocessed captured images depict objects in the product storage facility;
 outputting, by the trained machine learning model, processed images;
 associating, by a control circuit, each of the processed images into one of a first group, a second group, or a third group,
  wherein the first group corresponds to at least one of (a) images depicting one or more objects that are not detected by the trained machine learning model as being associated with a recognized product but a price tag was detected as being associated with the recognized product, or (b) images depicting the one or more objects having at least one of a textual similarity or a visual similarity with a product description stored in a database but the trained machine learning model did not detect as being associated with the recognized product,
  wherein the second group to images depicting one or more objects that are detected by the trained machine learning model as being associated with more than one recognized product, and
  wherein the third group corresponds to images depicting one or more objects that the trained machine learning model is unable to detect as depicting an object;
 removing, by the control circuit, the images associated with the third group from the processed images;
 calculating, by the control circuit, a similarity score for each of the processed images in the first group, each similarity score representing the textual similarity or the visual similarity between the processed image and previously processed images stored in the database that are associated with false-negatives;
 removing, by the control circuit, at least one processed image from the first group based on the similarity score for the at least one processed image; and
 outputting, by the control circuit, remaining processed images associated with the first group and processed images associated with the second group to be used to retrain the trained machine learning model.

11. The method of claim 10, further comprising:
 capturing, by one or more image capture devices, images of the objects in the product storage facility; and storing, by a database, at least one of the unprocessed captured images and the processed images.

12. The method of claim 11, wherein at least one of the one or more image capture devices is coupled to a motorized robotic unit.

13. The method of claim 10, wherein one or more of the processed images depict at least one or both of an object inside a bounding box or a price tag inside a bounding box.

14. The method of claim 10, further comprising outputting, by a user interface coupled to the control circuit to retrain the trained machine learning model, at least one of an association of a product with at least one depicted object in the remaining processed images associated with the first group or a resolution that one or more objects depicted in the images associated with the second group is only associated with a single product.

15. The method of claim 10, wherein the unprocessed captured images comprise images that have not gone through objection detection or object classification by the control circuit.

16. The method of claim 10, wherein removing the at least one processed image associated with the first group from the processed images can further include removing processed images that are similar to the previously processed images based on a location similarity with where the previously processed images were captured.

17. The method of claim 10, wherein others of the unprocessed captured images depict objects at one or more additional product storage facilities.

18. The method of claim 10, wherein the product storage facility comprises one of a retail store, a distribution center, and a fulfillment center.

\* \* \* \* \*